United States Patent
McQuillen et al.

(10) Patent No.: US 11,589,080 B2
(45) Date of Patent: Feb. 21, 2023

(54) METHOD AND APPARATUS FOR RELAYED ON-DEMAND LOCALIZED VIDEO SHARING

(71) Applicant: FORD GLOBAL TECHNOLOGIES, LLC, Dearborn, MI (US)

(72) Inventors: Michael McQuillen, Warren, MI (US); Daniel A. Makled, Dearborn, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1299 days.

(21) Appl. No.: 15/671,740

(22) Filed: Aug. 8, 2017

(65) Prior Publication Data

US 2019/0052915 A1    Feb. 14, 2019

(51) Int. Cl.
| | | |
|---|---|---|
| H04N 21/214 | (2011.01) | |
| H04N 21/2743 | (2011.01) | |
| H04N 21/654 | (2011.01) | |
| H04N 21/4223 | (2011.01) | |
| H04N 21/414 | (2011.01) | |
| G08G 1/00 | (2006.01) | |
| H04L 67/125 | (2022.01) | |
| H04L 67/145 | (2022.01) | |
| H04L 67/146 | (2022.01) | |
| H04N 21/258 | (2011.01) | |
| H04N 21/61 | (2011.01) | |
| H04W 4/02 | (2018.01) | |

(52) U.S. Cl.
CPC ........... *H04N 21/2146* (2013.01); *G08G 1/20* (2013.01); *H04L 67/125* (2013.01); *H04L 67/145* (2013.01); *H04L 67/146* (2013.01); *H04N 21/25841* (2013.01); *H04N 21/2743* (2013.01); *H04N 21/414* (2013.01); *H04N 21/4223* (2013.01); *H04N 21/6131* (2013.01); *H04N 21/654* (2013.01); *H04W 4/023* (2013.01)

(58) Field of Classification Search
CPC ................. G08G 1/20; H04N 21/2146; H04N 21/25841; H04L 67/125; H04L 67/1146
USPC ....................................................... 709/219
See application file for complete search history.

(56) References Cited

U.S. PATENT DOCUMENTS

| | | | | |
|---|---|---|---|---|
| 2012/0221677 A1* | 8/2012 | Kim | .................. | G01C 21/3694 709/217 |
| 2013/0325940 A1 | 12/2013 | Foti | | |
| 2014/0022108 A1* | 1/2014 | Alberth, Jr. | ............. | G01S 13/04 342/52 |
| 2014/0227980 A1* | 8/2014 | Esselink | ............. | H04B 1/3822 455/73 |
| 2015/0246672 A1* | 9/2015 | Pilutti | .................. | B60W 30/00 701/2 |

(Continued)

*Primary Examiner* — Vivek Srivastava
*Assistant Examiner* — Hien V Doan
(74) *Attorney, Agent, or Firm* — Joseph Zane; Brooks Kushman P.C.

(57) ABSTRACT

A system includes a processor configured to receive a request from a host vehicle for video relating to a location specified in the request. The processor is also configured to determine whether a candidate vehicle receiving the request can provide the request video when the request is received. The processor is further configured to relay the request to a transceiver in wireless communication with the candidate vehicle, if the candidate vehicle cannot provide the requested video, otherwise record and transmit the requested video.

2 Claims, 5 Drawing Sheets

(56) References Cited

U.S. PATENT DOCUMENTS

2016/0292936 A1* 10/2016 Palmer ................. B60R 16/023
2017/0018182 A1    1/2017 Makled et al.
2018/0330617 A1* 11/2018 Wei .................... B60K 31/0008

* cited by examiner

METHOD AND APPARATUS FOR RELAYED ON-DEMAND LOCALIZED VIDEO SHARING

TECHNICAL FIELD

The illustrative embodiments generally relate to methods and apparatuses for relayed on-demand localized video sharing.

BACKGROUND

Route planning and mapping has improved greatly over the last many years. Customers often use services that provide images of a particular location to guide them to a destination, or to gain familiarity with an area. Unfortunately, these images are often static, representing points in time when mapping occurred. As autonomous vehicles, ride sharing services, and connected cars become more popular, there is an increased desire to see areas of interest in real time.

Currently, when a traffic back-up occurs some miles up the road, or a construction zone appears on a digital map, a user has almost no available information about the slow-down. Some map data may indicate expected speed limits or delays, but often times the user is completely uninformed about the nature, length and duration of the delay.

A current option is to tune into a local radio station and receive guidance about the nature of the traffic problem. Of course, very few local radio stations provide perpetual traffic updates, so the driver may have to wait close to an hour before receiving useful information. The driver can always try to route around an issue or avoid the issue, but in doing so the driver may waste a large amount of time avoiding what ends up being a fairly minor issue. Since the driver's information may have been limited to a map displaying the presence of a slow-down, the driver had no way of knowing just how severe the issue was.

SUMMARY

In a first illustrative embodiment, a system includes a processor configured to receive a request from a host vehicle for video relating to a location specified in the request. The processor is also configured to determine whether a candidate vehicle receiving the request can provide the request video when the request is received. The processor is further configured to relay the request to a transceiver in wireless communication with the candidate vehicle, if the candidate vehicle cannot provide the requested video, otherwise record and transmit the requested video.

In a second illustrative embodiment, a system includes a processor configured to receive a video request, including a location, from a host vehicle. The processor is also configured to access a record of current candidate vehicle locations. The processor is further configured to determine a candidate vehicle within a predefined threshold distance of the location, based on the candidate vehicle locations. The processor is additionally configured to send an instruction to the candidate vehicle to record video. The processor is further configured to receive recorded video from the candidate vehicle and send the recorded video to the host vehicle.

In a third illustrative embodiment, a computer-implemented method includes recording video of an area-of-interest (AOI), using a candidate vehicle camera, responsive to a request from host vehicle, received through wireless transmission at a candidate vehicle including the camera and performing the recording. The method also includes transmitting recorded video to a plurality of transceivers wirelessly connected to the candidate vehicle and transmitting the request to the plurality of transceivers, responsive to determining that the candidate vehicle camera can no longer see the AOI.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
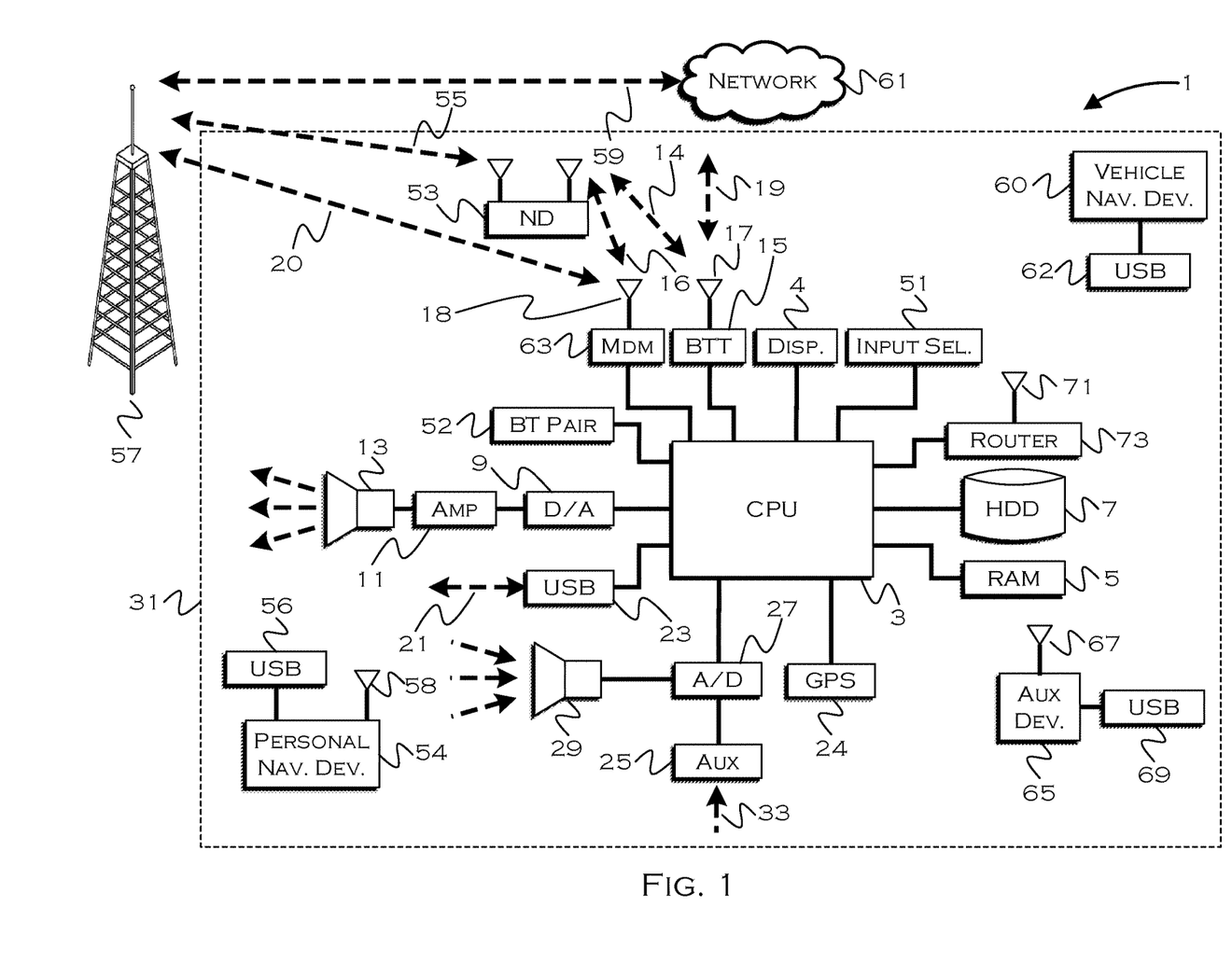
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While traffic helicopters and traffic cameras are occasional sources of live traffic information, these systems are typically highly localized and are often of little use in relation to 90%+ of existing road slowing conditions. Further, a driver cannot typically easily access a traffic feed or TV channel, and so the live video provided by these sources is virtually useless to a driver on the road.

A great source of live video is a person on-site at an incident with a camera, but again this is essentially useless to most drivers, because those drivers have no way to receive the live camera feed. That is, even if a person pulled over and began filming an incident, virtually no one on the road would be able to access the video.

Many modern vehicles come equipped with on-board outward-looking cameras as part of vehicle sensing suites. These cameras can act as part of driver-assistance systems, but the cameras can also serve a valuable purpose in the above model. By recording video of an ongoing incident, the vehicle provides a feed-source having a known location and part of a communication network (through telematics).

If a user can access the vehicle video feed, then the user can see what the vehicle sees. Since most original equipment manufacturers (OEMs) can access data on vehicles with driver permission, the OEM can use point sources of video (vehicles on the road) to serve out video to other customers.

Of course, video requires a great deal of bandwidth and data storage, so it may not be incredibly efficient to constantly have every vehicle on the road recording, transmitting and storing constant video feed. Further, there is typically little interest in random stretches of road where no incidents are occurring. By using an on-demand model, however, vehicles can record video responsive to requests, which provides targeted, on-site video of areas-of-interest (AOI).

One methodology leverages a manufacturer ability to locate and source vehicles as data providers. In this example, responsive to a request for on-site video, the OEM chooses one or more candidate video providing vehicles and requests live feeds from those vehicles. One or more of those live feeds can then be sourced back to the requesting vehicle, providing on-demand live video coverage of an AOI.

Another option uses dedicated short range communication (DSRC) transceivers and other vehicles to form a mobile mesh or ad-hoc network, relaying a request down the road from vehicle-to-vehicle, transceiver-to-vehicle, vehicle-to-transceiver and transceiver-to-transceiver. With enough clustering of vehicles, a very long network chain can be established, and a request could easily travel miles ahead of a driver to a location where an incident is occurring. Based on a location or area indicated in the request, when the request reaches the indicated area, a local vehicle or vehicles begins recording video responsive to the request. This video is then relayed back to the requesting vehicle in a similar manner (or sent directly via telematics if preferred). As long as there is not a break in the network chain, the video will eventually reach the target vehicle.

In networks such as this, continual connectivity is not a necessity unless continual data communication is used. Since vehicles can store packets until a next-hop in a network can be reached, a single vehicle leaving one network (group of vehicles and transceivers) and traveling 20 miles down the road to a new network (group of vehicles and transceivers) can effectively form a one-way bridge between the networks, even if none of the network objects have a communication range of more than 1000 feet or so. The traveling vehicle simply stores all data packets while in communication with the first network, travels to the second network and relays all the stored packets.

While such a gap prevents uninterrupted streaming, it allows for an ad-hoc network to essentially cover all of the country's road networks without having to physically provide access points or relays every 100 or 1000 feet. Even if data is not immediately live (i.e., the video is what happened 5 minutes ago, as opposed to presently), the data is effectively "live enough" in even a worst-case scenario and thus provides far more information to a requesting driver than may be obtained from a relatively static map. If there was an uninterrupted data flow (vehicles and transceivers in close-enough proximity between a data source and a requesting vehicle), the data could be relayed back to the requestor in near real-time.

Figure 2:
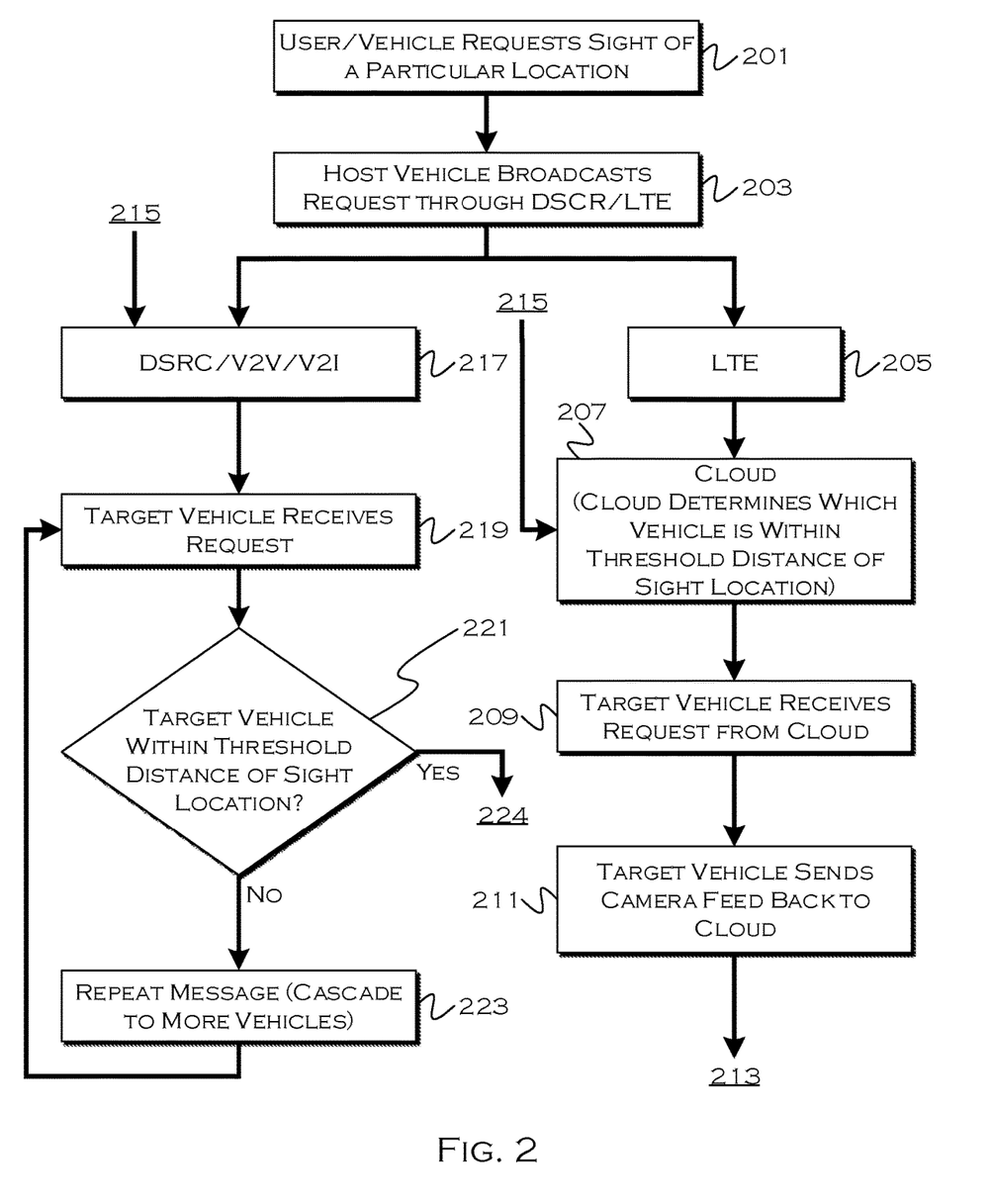
FIG. 2 shows an illustrative process for requesting and receiving on-demand video.

FIG. 2 shows an illustrative process for requesting and receiving on-demand video. In this example, a user (host) vehicle requests 201 video from a target location. The user can specify the location by selecting a map-location, a map area, a traffic or slowdown incident, a point of interest (POI), etc. The area is referred to herein as an area of interest (AOI) for convenience, although it could be a single point location.

The host vehicle then broadcasts 203 a request for video through a DSRC network or using a telematics system. Both options could be used at once, or the vehicle could choose a preferred option. The request may include, for example, a host identifier, a host location and the indicated AOI. While the user may specify a point or area, the process may leverage vehicles believed to be within sight of the AOI, such that a vehicle responding to the request does not necessarily have to be physically located at the AOI or location in order to service the request. A threshold perimeter and camera heading (what the camera can see) may be used by a determination process to elect a particular candidate vehicle.

In the telematics example shown, the process uses a cellular network (LTE network) 205 to service the request. The host vehicle sends the request to a cloud server, where the cloud server determines 207 one or more vehicles within a threshold distance of the specified AOI. The cloud server may also consider congestion (which may block low-lying cameras) and/or vehicle orientation, among other things, when selecting candidate vehicles.

Once the cloud server has determined a candidate vehicle, the cloud server sends 209 the request to the determined candidate vehicle. The vehicle receives the request, which may also include a set of parameters, such as, for example, recording time, AOI coordinates, etc. The vehicle may use the parameters to confirm the suitability of the selected candidate vehicle, and may send 211 back a live camera feed if appropriate. If the selected candidate cannot service the request or does not meet a parameter, the vehicle may reject the request and the cloud server could select another candidate vehicle.

The cloud server relays 213 the video from the target vehicle to the host vehicle, and the host vehicle thus receives near-live footage recorded by the target vehicle camera. As long as the host vehicle continues requesting video 215, the process can continue, either using the current target vehicle or using a new target vehicle if the previous target vehicle cannot service the request for some reason.

In the illustrative alternative also shown in FIG. 2, the process uses a vehicle to vehicle (V2V) and/or vehicle to infrastructure (V2I) network 217 to relay-hop the request up to one or more candidate vehicles. In this example, a given vehicle receives 219 the request from the host, and self-determines 221 if the given vehicle meets parameters associated with the request (e.g., without limitation, is the given vehicle within a threshold distance of the AOI, does it have the proper heading, is traffic too thick for useful camera data, etc).

If the given vehicle determines that it is unsuitable to service the request, the vehicle cascades 223 the request to more vehicles or infrastructure. In one model, this can involve sending the request to all other vehicles and transceivers in communication with the given vehicle, although other models could also be used that limit the cascading. The self-determination process repeats in each vehicle receiving the request, until a vehicle confirms that it can service the request.

Figure 4:
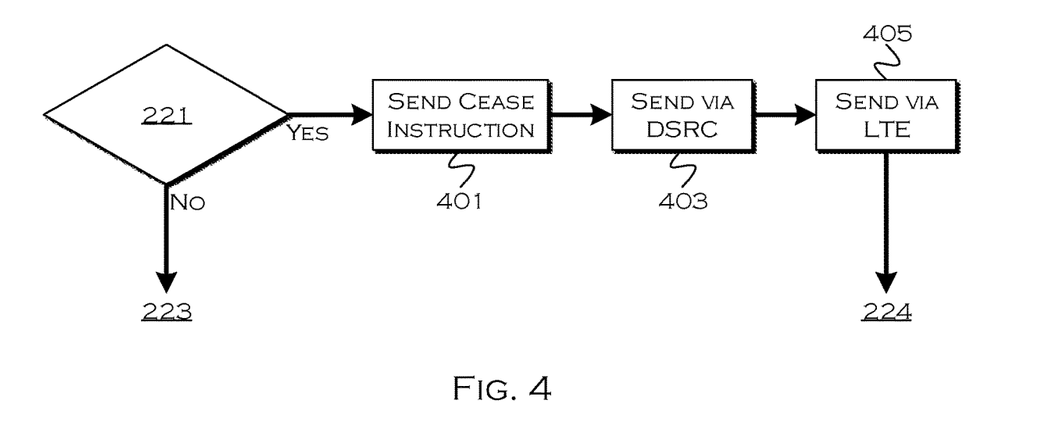
FIG. 4 shows an illustrative process for request termination.

One apparent issue with the cascading model is that requests could essentially be bouncing between vehicles for an indeterminate amount of time, while a certain vehicle is already servicing the request. This could result in a large number of candidate vehicles attempting to unnecessarily service a request, and so FIG. 4 shows an example of how to terminate a request once a candidate vehicle is selected. Another option is to put a short expiration period on a request, so that a request cascade dies within a reasonably short time period, and then if one or more vehicles are servicing the request the host receives the feed, and if the host has not received the feed within the time period the host can resend the request (since the hop-relays will have terminated due to timeout). A time-buffer to accommodate the time for the video to return to the host can also be built-in by the host before re-attempting, so that the host does not re-send the request while a video feed is incoming, but simply has not yet reached the host.

Once a suitable target vehicle receives the cascaded request, the vehicle broadcasts video feed 224 of the requested AOI, recorded through vehicle cameras. This message is received 225 by other vehicles or infrastructure between the host and target (candidate) vehicle. Each vehicle receiving the feed can self-determine 227 if that vehicle is the host, and, if not, the vehicle cascades 229 the video feed in a manner similar to request-delivery. In this model, any particular vehicle in the chain could also elect to begin receiving the video, which would provide in-between drivers with incidental footage of an area of interest, which could be useful if the AOI was an accident or other slow-down that would affect those drivers too.

Once the request reaches the host vehicle, the host vehicle displays 231 the footage or feed (this may vary based on network sustainability or user-request). If the user wants additional footage or for a feed to continue 233, the request and return process can be repeated.

Figure 3:
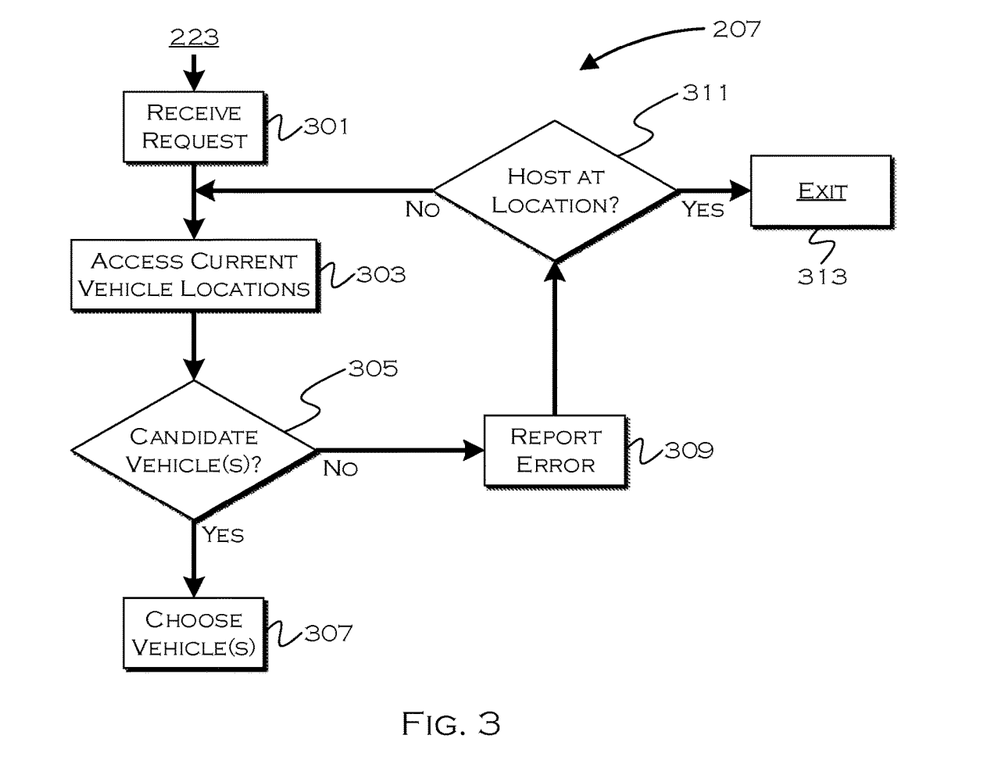
FIG. 3 shows an illustrative process for source-vehicle selection.

FIG. 3 shows an illustrative process for source-vehicle selection. In this example, the process uses request-specified parameters to elect one or more candidate vehicles for request servicing. The process receives 301 the request from the host vehicle, and the request indicates at least an area of interest. The host vehicle heading or location may also be included, so that in cases where the AOI relates to traffic, and there is a back-up on an opposite side of the road from the host vehicle, that data may not necessarily be relevant. This can also help prevent electing inappropriate candidates (which may sometimes include vehicles traveling in the opposite direction). Opposing traffic may sometimes be useful from a recording perspective, because that traffic may be able to quickly capture an entire backup if not affected by the backup, so opposing-traveling vehicles are not always ignored, but in other instances those vehicles may be located in a correct AOI but not be positioned to provide much data of interest.

The cloud server receiving the request accesses 303 a database including current vehicle locations for a number of possible candidate vehicles. For example, the cloud server may set a predefined perimeter around an AOI and may examine all possible vehicles within that perimeter. The perimeter can be based on what vehicle camera locations could see the requested AOI, how dense traffic, trees, buildings, etc are in an area, etc. A 50 foot perimeter around the AOI may be appropriate in one instance, and a 500 foot perimeter may be appropriate in another.

Based on a reasonable expectation that a given vehicle camera can see and record the AOI, the process may elect 305 one or more candidate vehicles for servicing the request. If there are no candidates, the process may report 309 an error back to the host vehicle. In this example, the process continues to attempt to find candidates until the host vehicle reaches 311 the target location, although timeouts and other terminating conditions could also be considered. Once the host vehicle actually reaches the target location, the process terminates 313. On the other hand, if a candidate is found before the host reaches the location, the process chooses the candidate(s) and proceeds to send the request to those vehicles. A single candidate may be sufficient to service most requests, but multiple feeds from multiple candidates could also be used if desired.

FIG. 4 shows an illustrative process for request termination. In this example, the process acts to terminate a current request based on the fact that a certain vehicle is now servicing the request. In the cascading model, it is nearly impossible to determine which vehicles are currently holding a request and attempting to respond, so it could be difficult for the servicing vehicle to simply contact all other candidates directly and tell them that the request was being handled. Instead, in this example, the current target (candidate) vehicle doing the recording can send 401 out a cease instruction to surrounding vehicles. This can include, for example, sending a request-identifier, so the surrounding vehicles know to which request the cease instruction refers.

Surrounding vehicles receiving the cease instruction can both terminate attempts to service the instruction and terminate relaying the instruction. If the request-identifier is included, those vehicles can also ignore further transmission of the request to the vehicle. This can quickly kill a request (since presumably the earliest hops of the cease-cascade will be to other candidate vehicles, being in the same area as the current target/candidate vehicle) and can help prevent the host vehicle from receiving a large number of responsive video feeds from a large number of target vehicles. The vehicle can send the request as a cascade 403 to local vehicles to kill the request, and the target vehicle can use host vehicle information to send 405 a kill command directly to the host vehicle, to prevent the re-sending of a request (which is now being serviced by the target).

Figure 5:
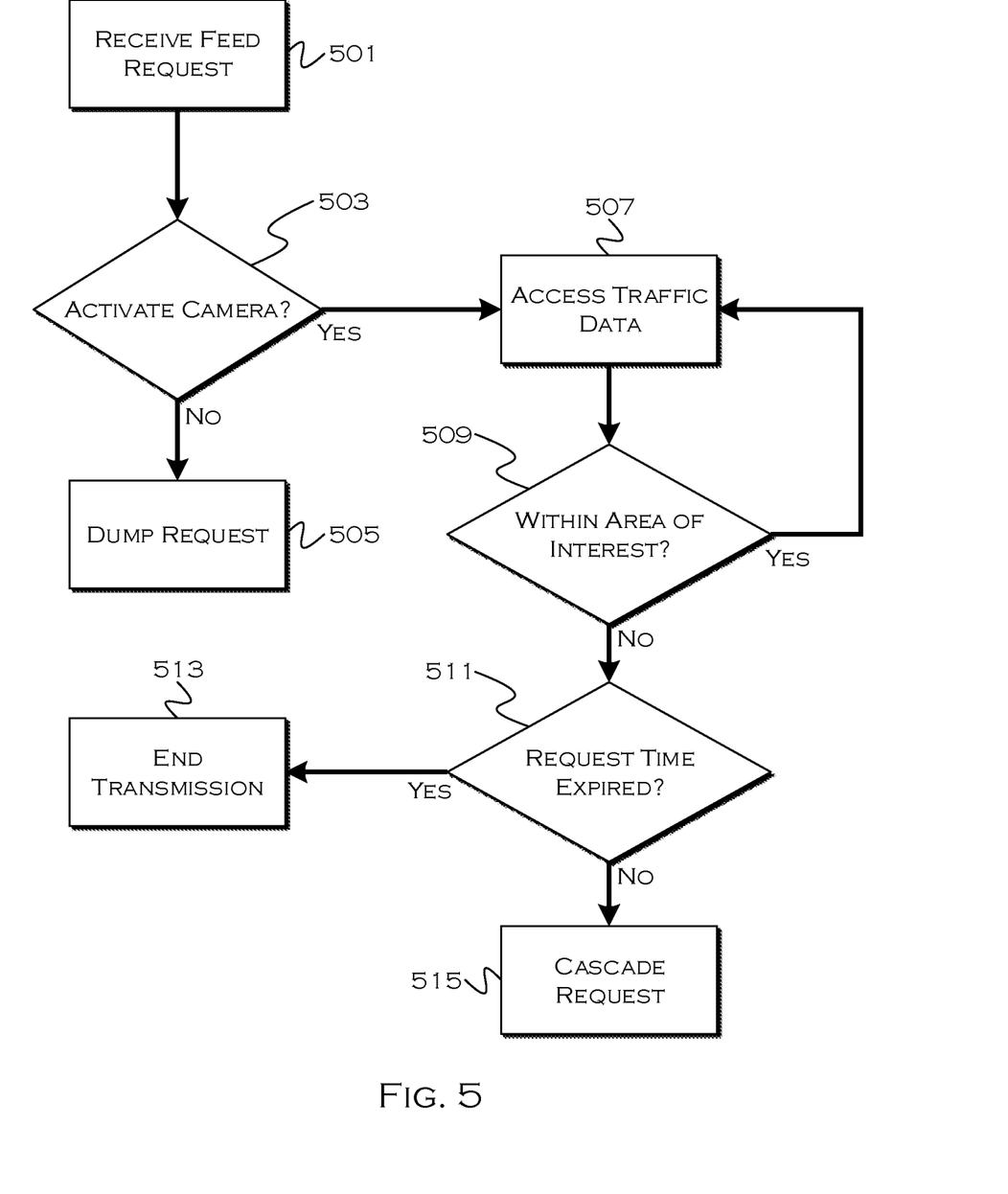
FIG. 5 shows an illustrative process for request perpetuation.

FIG. 5 shows an illustrative process for request perpetuation. In this example, a host user may have requested five minutes of video feed, or a request may have a five minute timeout associated therewith. Depending on travel conditions, an initial target vehicle may not be able to service the request for the entire specified time period. Instead of forcing the host to resend the request (which is also possible), this example shows how the target vehicle can perpetuate the request if the target can no longer service the request.

In this example, a possible target vehicle receives 501 the request and can go through the self-selection process or a similar process. If the vehicle cannot service the request 503, the vehicle may dump 505 the request (after passing the request to other vehicles, if appropriate).

If the target vehicle begins recording, the process can either refer to included AOI coordinates or, in other instances where an AOI may be dynamic based on an incident-size, access 507 traffic data to determine 509 whether the target vehicle is still within the appropriate AOI. As long as the vehicle remains within the AOI, the process can continue to send camera data.

Once the vehicle leaves the AOI, the process determines if a request has ended, which, in this example, includes checking 511 a time-duration of the original request. If the target vehicle was only able to capture a couple of seconds of traffic for a 30 second request, for example, the host vehicle driver may still be interested in additional data. Instead of having the host send a new request, the target vehicle determines 511 if time has expired on the request. If the request has not ended, the target vehicle relays 515 the request (using, for example, the cascade model). The origi-nal host vehicle is still specified in the request, so if another target vehicle services the request, the data will make it back to the host vehicle. Otherwise the target vehicle simply ends 513 transmission (if the request time has expired).

Using the illustrative examples, drivers can obtain real-time or near-real time footage and streaming data representing current events in an area or point of interest. This can help resolve a great deal of uncertainty related to slowdowns, and can also provide unfamiliar drivers with a view of an upcoming area. By using other vehicles and infrastructure, the data can be requested and received without having to implement new systems explicitly designed to gather this data specifically.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A computer-implemented method comprising:
    recording video of an area-of-interest (AOI), using a candidate vehicle camera, responsive to a request from a host vehicle, received through wireless transmission at a candidate vehicle including the camera and performing the recording;
    transmitting recorded video to a plurality of transceivers wirelessly connected to the candidate vehicle; and
    transmitting the request to the plurality of transceivers, responsive to determining that the candidate vehicle camera can no longer detect the AOI and to determining that an original time limit associated with the request has not yet expired.

2. The method of claim 1, further comprising:
    setting a new time limit to an amount of time remaining in the original time limit, and wherein the transmitting further comprises transmitting the request, including the new time limit.

* * * * *